US00RE40997E

(19) United States
(12) Reissued Patent
Sunaga

(10) Patent Number: US RE40,997 E
(45) Date of Reissued Patent: Nov. 24, 2009

(54) SPREAD SPECTRUM COMMUNICATION TRANSMITTER AND RECEIVER, AND CDMA MOBILE COMMUNICATION SYSTEM AND METHOD

(75) Inventor: Terumi Sunaga, Yokohama (JP)

(73) Assignee: Mitsubishi Denki Kabushiki Kaisha, Tokyo (JP)

(21) Appl. No.: 10/717,424

(22) Filed: Nov. 19, 2003

Related U.S. Patent Documents

Reissue of:
(64) Patent No.: 6,381,233
Issued: Apr. 30, 2002
Appl. No.: 08/820,608
Filed: Mar. 19, 1997

(30) Foreign Application Priority Data

Mar. 25, 1996 (JP) ..... 8-092954

(51) Int. Cl.
*H04J 13/00* (2006.01)
*H04B 7/216* (2006.01)

(52) U.S. Cl. ..... 370/335; 370/342; 375/141
(58) Field of Classification Search ..... 370/335, 370/342, 320, 441, 491, 500; 375/141, 200, 375/205, 267
See application file for complete search history.

(56) References Cited

U.S. PATENT DOCUMENTS 5,341,397 A 8/1994 Gudmundson
5,414,728 A * 5/1995 Zehavi ..... 375/142
5,414,734 A 5/1995 Marchetto et al.
5,416,797 A 5/1995 Gilhousen et al.
5,448,600 A 9/1995 Lucas
5,471,497 A 11/1995 Zehavi
5,544,167 A 8/1996 Lucas et al.
5,559,789 A 9/1996 Nakano et al.
5,577,025 A 11/1996 Skinner et al.
5,636,243 A * 6/1997 Tanaka ..... 375/219
5,646,632 A 7/1997 Khan et al.
5,799,010 A * 8/1998 Lomp et al. ..... 370/335
5,841,806 A * 11/1998 Gilhousen et al. ..... 375/146
5,920,555 A * 7/1999 Hulbert ..... 370/342
5,943,331 A * 8/1999 Lavean ..... 370/335
5,943,361 A * 8/1999 Gilhousen et al. ..... 375/142
6,272,128 B1 * 8/2001 Pierson, Jr. ..... 370/352

FOREIGN PATENT DOCUMENTS

JP 8 186558 7/1996
JP 08335899 12/1996

* cited by examiner

*Primary Examiner*—Alpus H. Hsu
(74) *Attorney, Agent, or Firm*—Ladas & Parry LLP

(57) ABSTRACT

A transmitter used in a CDMA mobile communication system includes a pilot channel transmit unit which intermittently transmits a pilot signal in a spread spectrum formation, and traffic channel transmit units which respectively transmit data signals in respective traffic channels.

13 Claims, 16 Drawing Sheets

61
AMPLIFIER
62
FREQUENCY CONVERTER
63
BAND LIMITER
64
PILOT CHANNEL
DESPREADER
8
PATH DETECTOR
11
TIMING REGENERATOR
65
HAND-OVER CONTROLLER
19
LEVEL MEASURING UNIT
18
44
TRAFFIC CHANNEL RECEIVE
DESPREADER
9
DESPREADER
10
RAKE COMBINER
12
INFORMATION DEMODULATOR
13
DEINTERLEAVE
66
ERROR CORRECTION DECODER
67
45
RECEIVED DATA

SPREAD SPECTRUM COMMUNICATION TRANSMITTER AND RECEIVER, AND CDMA MOBILE COMMUNICATION SYSTEM AND METHOD

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a CDMA (Code Division Multiple Access) mobile communication system and method using a spread spectrum communication system. Further, the present invention is concerned with a spread spectrum communication transmitter and receiver used for such a CDMA mobile communication system.

2. Description of the Related Art

FIG. 1 is a block diagram of a base station transmitter used in a CDMA mobile communication system using a conventional spread spectrum communication system, which is typically described in the IS/95 that is a standard system in the U.S. Telecommunications Industry Association/Electronic Industries Association (TIA/EIA). FIG. 2 is a block diagram of a mobile station receiver in the CDMA mobile communication system.

The transmitter shown in FIG. 1 can simultaneously communicate with n mobile stations where n is an integer. More particularly, the transmitter includes traffic channel transmit units $\mathbf{31}_1$, $\mathbf{31}_2$, . . . , and $\mathbf{31}_n$, which respectively communicate with the first, second, . . . , and nth mobile stations. Each of the traffic channel transmit units $\mathbf{31}_1$ through $\mathbf{31}_n$ includes an information modulator 2 and a spread spectrum modulator 5. The information modulator 2 of each traffic channel modulates transmit data (information) 4 by a BPSK, QPSK or another modulation method. The modulated transmit data is applied to the spread spectrum modulator 5. The spread spectrum modulators 5 of the traffic channel transmit units $\mathbf{31}_1$ through $\mathbf{31}_n$ generate respective spreading codes (PN codes). The spread spectrum modulator 5 of each traffic channel spread the spectrum of the modulated transmit data from the information modulator 2.

The transmitter shown in FIG. 1 has a pilot channel transmit unit 30. The mobile receivers discriminate the base stations from each other by referring to the pilot channel. The pilot channel transmit unit 30 includes a pilot data generator 1, an information modulator 2 and a spread spectrum modulator 3. The information modulator 2 modulates pilot data generated by the pilot data generator 1 by the BPSK, QPSK or another modulation method. The spread spectrum modulator 3 spreads the spectrum of the modulated pilot data by using a spreading code specifically used for the pilot channel and different from the spreading codes used for the traffic channels. The pilot signal thus generated can be arbitrary data which can be known in the base stations and the mobile receivers. For example, data consisting of only binary ones or binary zeros can be used as the pilot data.

The output signals of the traffic channel transmit units $\mathbf{31}_1$ through $\mathbf{31}_n$ and the pilot channel transmit unit 30 are combined so that the pilot channel and the traffic channels are simultaneously transmitted in a given frequency band. Then, the combined radio signal is transmitted via an antenna.

FIG. 3 shows a relation between the pilot and traffic channels with respect to time. As shown in FIG. 3, the pilot signal is always transmitted without any interval. In this regard, the pilot signal is a continuous signal.

Referring to FIG. 2, the mobile receiver used in the conventional CDMA mobile communication system includes a pilot channel receive unit 34, and a traffic channel receive unit 35. The pilot channel receive unit 34 includes a despreader 8, a path detector 11 and a hand-over controller 19. The traffic channel receive unit 35 includes despreaders 9 and 10, a RAKE combiner 12, an information demodulator 13, and a level measuring unit 14 for controlling a transmit power.

The despreader 8 performs a despreading process on the received signal by using the spreading code for the pilot channel. The despreaders 9 and 10 perform a despreading process on the received signal by using the spreading code allocated to the receiver shown in FIG. 2 at the transmitter. The path detector 11 detects multiple paths from the pilot signal. The hand-over controller 19 performs a hand-over control by using the results of the multipath detection obtained by the path detector 11. The output signal of the path detector 11 is also used as a timing signal used for the despreading process carried out by the despreaders 9 and 10. The RAKE combiner 12 performs a RAKE process on the despread signals from the despreaders 9 and 10. The information demodulator 13 demodulates the output signal of the RAKE combiner 12 to thereby generate the original information. The level measuring unit 14 performs a level measuring operation for controlling the transmit power.

FIG. 4 shows a cell structure of the CDMA mobile communication system having the above transmitter and receiver. There are illustrated first, second, third and fourth base stations 21, 22, 23 and 24, which cover service areas (cells) 26, 27, 28 and 29, respectively. All the base stations 21 through 24 have transmitters as shown in FIG. 1. A reference number 25 indicates a mobile receiver (station) having the structure shown in FIG. 2. The mobile station 25 is located within the cell 26 covered by the base station 21, and can communicate with the base station 21.

FIG. 5 is a timing chart of timings at which the base stations 21 through 24 respectively transmit the pilot signal. In the conventional CDMA mobile communication system, all the base stations 21 through 24 employ the same spreading code for spreading the pilot data. The period of the spreading code used to spread the pilot data is sufficiently longer than one symbol time of information (data). As shown in FIG. 5, the base stations 21 through 24 transmit the same spreading code for the pilot channel with respective inherent offset times equal to a time t'. That is, the starting points of the spreading codes used in the base stations 21 through 25 are offset by the time t'.

The mobile station 25 shown in FIG. 4 receives the pilot signals from the base stations 21, 22, 23 and 24. Usually, the pilot signal from the base stations 21 closet to the mobile station 25 has the strongest level. The despreader 8 of the pilot channel receive unit 34 shown in FIG. 2 performs the despreading process on the received signal by using the same spreading code as used in the transmitter.

FIG. 6A shows a correlation between the spreading code for the pilot channel and the pilot signal transmitted by the base station 21 and received by the mobile station 25. Similarly, FIGS. 6B, 6C and 6D show correlations with the pilot signals transmitted by the base stations 22, 23 and 24 and received by the mobile station 25. Peaks 201 through 204 respectively shown in FIGS. 6A through 6D indicate timing synchronization points in the pilot channels of the base stations 21 through 24. Variations in the waveforms other than the peaks 201 through 204 shown in FIGS. 6A through 6D result from a self-correlation of the spreading code for the pilot channel. These variations in the waveforms are noise components for the mobile station 25 (receiver).

The mobile station 25 shown in FIG. 4 receives the signals of the pilot channels transmitted by the base stations 21 through 24 in such a state that the signals are superimposed. Hence, the output signal of the despreader 8 of the pilot channel receive unit 34 has a formation in which the four waveforms shown in FIGS. 6A through 6D are superimposed. It should be noted that the correlations shown in FIGS. 6A through 6D are not affected by multipath fading or Rayleigh fading.

The path detector 11 shown in FIG. 2 detects the greatest peak in the output signal of the despreader 8 (the greatest peak in the superimposed correlation waveform). In the case of FIG. 4, the mobile station 25 is located within the cell 26 of the base station 21. Hence, the propagation distance between the base station 21 and the mobile station 25 is shorter than the propagation distances from the base stations 22, 23 and 24. Hence, the path between the base station 21 and the mobile station 25 has the smallest propagation loss. Hence, the greatest peak in the despread received signal output by the despreader 8 corresponds to the correlation peak 201 of the pilot channel of the base station 21 having the cell 26 in which the mobile station 25 is located.

Since the pilot signals transmitted by the base stations 21 through 24 have respective inherent time offsets. Hence, by detecting the greatest peak of the superimposed correlation waveform, it is possible for the mobile station 25 to discriminate the base station 21 from the other base stations 22 through 24 and detect the timing of spectrum-spreading. The path detector 11 informs the despreaders 9 and 10 of the traffic channel receive unit 35 of the timing of the greatest peak 201.

The despreaders 9 and 10 perform the despreading processes on the received signal of the allocated traffic channel at the timing informed by the path detector 11. The RAKE combiner 12 performs a RAKE combination process (path diversity combination) on the output signals of the despreaders 9 and 10 by using information concerning the pilot channel supplied from the path detector 11. The above information includes information concerning the timing, amplitude (receive power level) and phase of the pilot signal. The information demodulator 13 demodulates the output signal of the RAKE combiner to thereby produce the original information (data).

The level measuring unit 14 measures the received signal of the traffic channel by using the output signal of the RAKE combiner 12, and controls the transmission power of the mobile station 25. It will be noted that a transmit part of the mobile station shown in FIG. 2 is omitted for sake of convenience.

The hand-over controller 19 performs a control by using the output signal of the path detector 11 so that the mobile station 25 is handed over to the area of the base station which transmits the pilot signal received as the greatest peak at the mobile station 25.

However, the conventional CDMA mobile communication system thus configured has a disadvantage in that a good S/N ratio cannot be obtained at the time of receiving the pilot signals from the base stations due to the fact that all the base stations continue to transmit the pilot signals. The mobile station 25 shown receives the pilot signal from the base station 21 to which the mobile station 25 belongs so that the signals of the pilot channels transmitted by the other base stations 22, 23 and 24 are superimposed, as noise components, on the pilot channel data signal from the base station 21. Hence, the pilot channel receive unit 34 does not have a goon S/N ratio.

The signals of the pilot channels transmitted by the base stations 22 through 24 serve as interference signals with respect to the signal of the traffic channel processed by the traffic channel receive unit 35 of the mobile station 25. That is, the mobile station 25 always receives the signals of the pilot channels transmitted by the base stations 22 through 24 to which the mobile station 25 does not belong, and thus always receives interference by the base stations 22 through 24. Hence, the given frequency range can accommodate only a reduced number of stations (corresponding to a channel capacitance).

SUMMARY OF THE INVENTION

It is a general object of the present invention to eliminate the above disadvantages.

A specific object of the present invention is to provide a CDMA transmitter and a CDMA receiver which can realize a CDMA mobile communication system in which an interference by signals transmitted via pilot channels by base stations is eliminated and an increased channel capacity and an improved SIN ratio can be obtained.

Another object of the present invention is to provide such a CDMA mobile communication system and a CDMA mobile communication method employed in the system.

The above objects of the present invention are achieved by a transmitter used in a CDMA mobile communication system comprising: a pilot channel transmit unit which intermittently transmits a pilot signal in a spread spectrum formation; and traffic channel transmit units which respectively transmit data signals in respective traffic channels.

The transmitter may be configured so that the pilot channel transmit unit comprises: a pilot data generator which generates pilot data; a first modulator which modulates the pilot data; a second modulator which spreads a spectrum of modulated pilot data from the first modulator to thereby generate the pilot signal; and a timing generator which generates a timing signal applied to at least one of the pilot data generator and the first and second modulators so that the pilot signal can be intermittently transmitted.

The transmitter may be configured so that the pilot signal has a period shorter than an interval at which the pilot signal is intermittently transmitted.

The above objects of the present invention are also achieved by a receiver used in a CDMA mobile communication system comprising: a pilot channel receive unit which demodulates pilot signals respectively transmitted intermittently in a spread spectrum formation by transmitters and detects, from the pilot signals, a timing for a traffic channel demodulation; and a traffic channel receive unit which demodulates data at the timing detected by the pilot channel receive unit.

The receiver may be configured so that the pilot channel receive unit detects the timing for the traffic channel demodulation by comparing peaks of the pilot signals intermittently transmitted, the timing for the traffic channel demodulation corresponding to a greatest one of the peaks.

The receiver may be configured so that it further comprises an estimating unit which estimates states of paths from the pilot signals intermittently transmitted.

The receiver may be configured so that the estimating unit supplies the traffic channel receive unit with information necessary to the traffic channel demodulation and based on an estimated state of the path to be demodulated.

The above objects of the present invention are also achieved by a CDMA mobile communication system comprising transmitters and receivers; each of the transmitters comprising: a pilot channel transmit unit which intermittently transmits a pilot signal in a spread spectrum formation; and traffic channel transmit units which respectively transmit data signals in respective traffic channels. Each the receivers comprises: a pilot channel receive unit which demodulates pilot signals respectively transmitted intermittently in the spread spectrum formation by the transmitters and detects, from the pilot signals, a timing for a traffic channel demodulation; and a traffic channel receive unit which demodulates data at the timing detected by the pilot channel receive unit.

The CDMA mobile communication system may be configured so that the transmitters intermittently transmit the pilot signals with time offsets.

The CDMA mobile communication system may be configured so that the transmitters intermittently transmit the pilot signals with the time offsets so that the pilot signals are serially transmitted one by one.

The CDMA mobile communication system may be configured so that the transmitters intermittently transmit the pilot signals with the time offsets so that only one of the pilot signals is transmitted at any time.

The CDMA mobile communication system may be configured so that the transmitters intermittently transmit the pilot signals with the time offsets so that a time period is provided during which none of the pilot signals are transmitted.

The above objects of the present invention are also achieved by a CDMA mobile communication method comprising the steps of: a) transmitting, on transmit sides, pilot signals in a spread spectrum formation; b) demodulating, on a receive side, the pilot signals respectively transmitted intermittently; and c) detecting, on the receive side, from the pilot signals, a timing for a traffic channel demodulation.

The CDMA mobile communication method may be configured so that the step a) comprises the step of intermittently transmitting the pilot signals with time offsets.

The CDMA mobile communication method may be configured so that the step a) intermittently transmits the pilot signals with the time offsets so that the pilot signals are serially transmitted one by one.

The CDMA mobile communication method may be configured so that the step a) intermittently transmit the pilot signals with the time offsets so that only one of the pilot signals is transmitted at any time.

The CDMA mobile communication method may be configured so that the step a) intermittently transmits the pilot signals with the time offsets so that a time period is provided during which none of the pilot signals are transmitted.

BRIEF DESCRIPTION OF THE DRAWINGS

Other objects, features and advantages of the present invention will become apparent from the following detailed description when read in conjunction with the accompanying drawings, in which.

DETAILED DESCRIPTION

Figure 7:
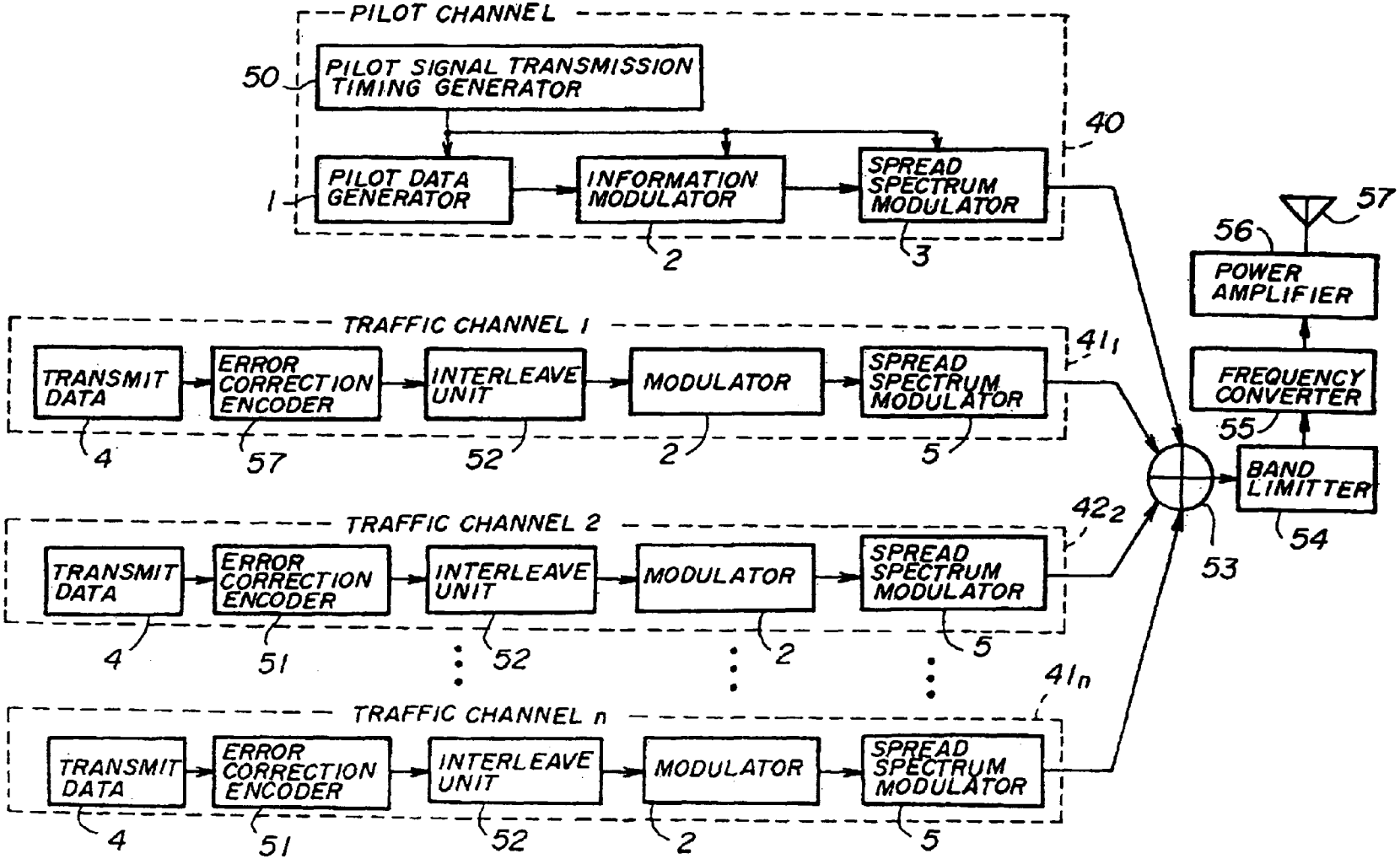
FIG. 7 is a block diagram of a spread spectrum communication transmitter used in a CDMA mobile communication system according to a first embodiment of the present invention.

FIG. 7 is a block diagram of a spread spectrum communication transmitter used in a CDMA mobile communication system according to a first embodiment of the present invention. In FIG. 7, parts that are the same as those shown in the previously described figures are given the same reference numbers.

Figure 1:
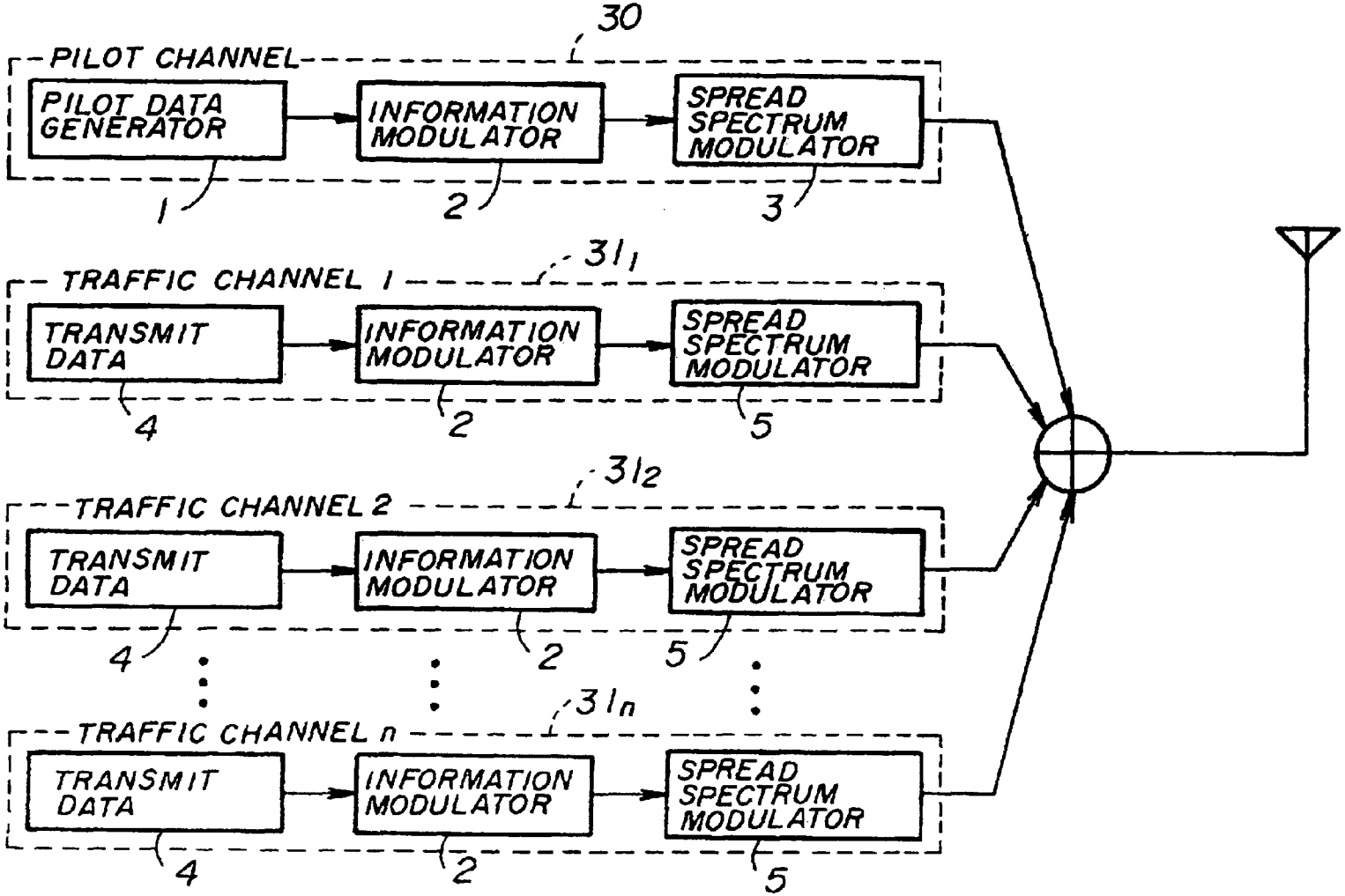
FIG. 1 PRIOR ART
FIG. 1 is a block diagram of a spread spectrum communication transmitter used in a conventional CDMA mobile communication system.
Figure 2:
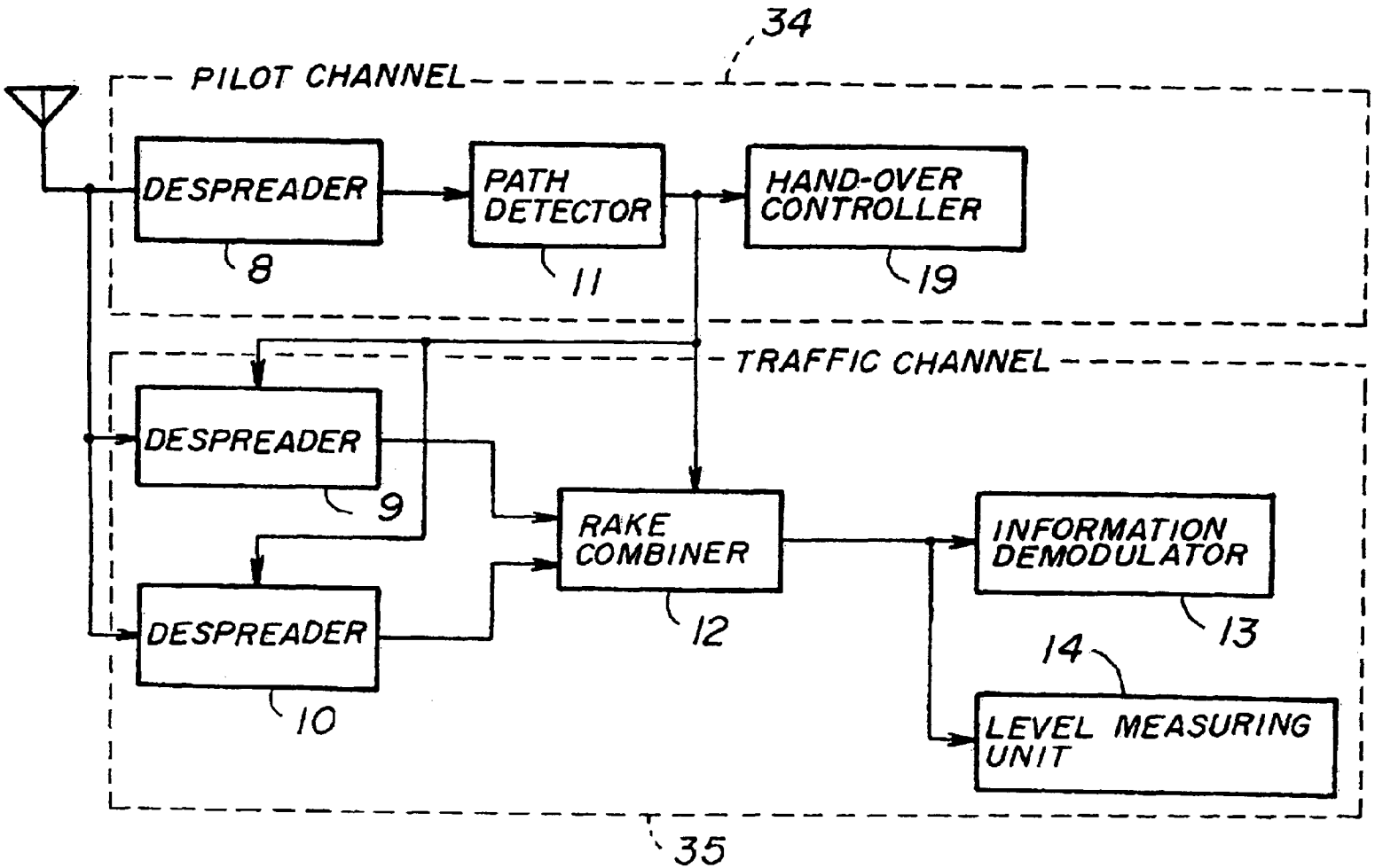
FIG. 2 PRIOR ART
FIG. 2 is a block diagram of a spread spectrum communication receiver used in the conventional CDMA mobile communication system.
Figure 3:
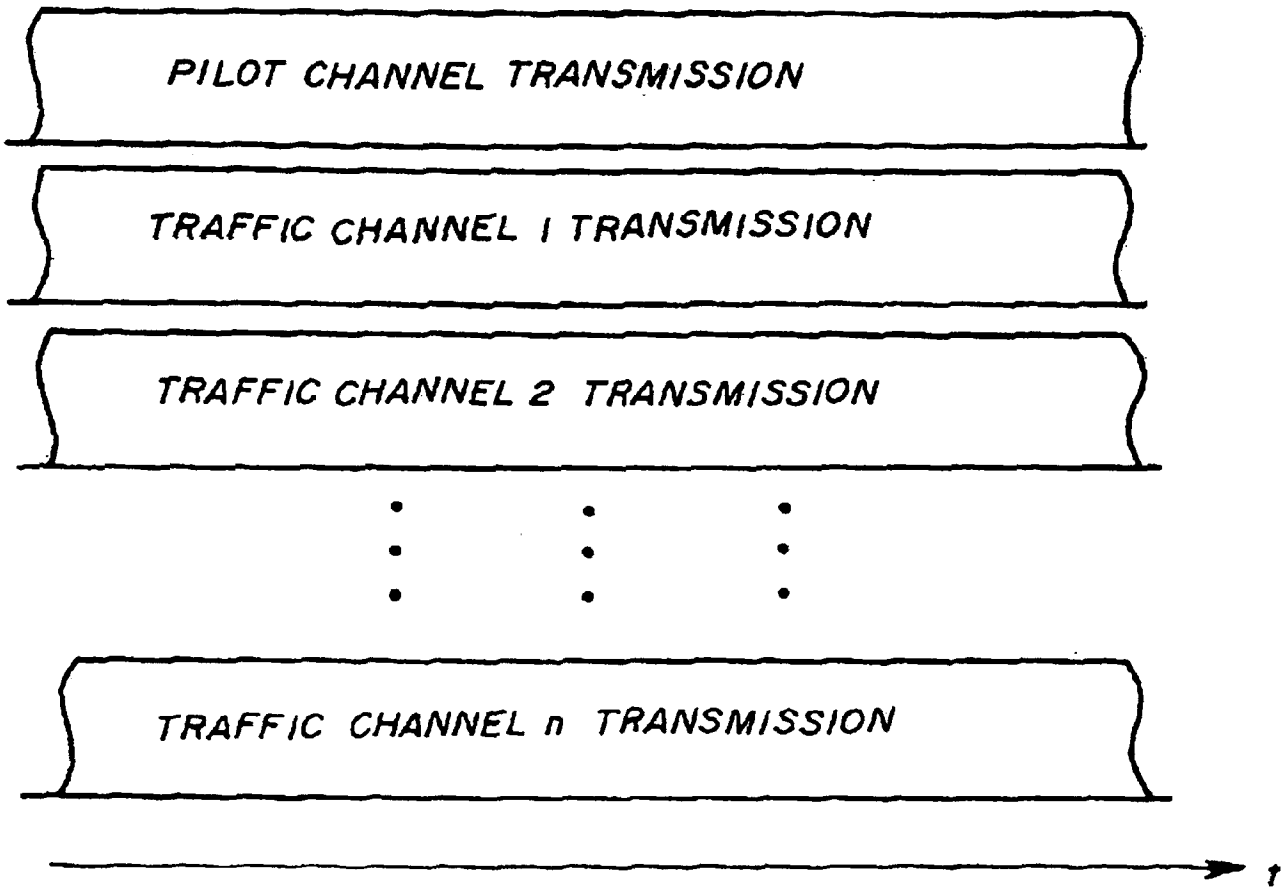
FIG. 3 PRIOR ART
FIG. 3 is a diagram showing transmissions in a pilot channel and traffic channels in the conventional system.

The transmitter shown in FIG. 7 includes a pilot channel transmit unit 40, and n traffic channel transmit units $\mathbf{41}_1$, $\mathbf{41}_2$, . . . , and $\mathbf{41}_n$, which communicate with the first, second, . . . , and nth mobile stations. The pilot channel transmit unit 40 includes a pilot transmission timing generator 50 in addition to the aforementioned pilot data generator 1, the information modulator 2 and the spread spectrum modulator 3. The pilot transmission timing generator 50 generates a pilot transmission timing signal, which is applied to the pilot data generator 1, the information modulator 2 and the spread spectrum modulator 3. In this regard, the pilot channel transmit unit 40 shown in FIG. 7 differs from that shown in FIG. 1.

The pilot transmission timing signal controls the pilot data generator 1, the information modulator 2 and the spread spectrum modulator 3 so that the pilot signal is intermittently transmitted. This will be described later with reference to FIG. 9.

The traffic channel transmit units $\mathbf{41}_1$ through $\mathbf{41}_n$ have an identical structure. Each of the traffic channel transmit units $\mathbf{41}_1$ through $\mathbf{41}_n$ has an error correction encoder 51 and an interleave unit 52 in addition to the information modulator 2 and the spread spectrum modulator 5. The transmit data 4 is subjected to an error correction encoding process by the error correction encoder 51, and is then subjected to an interleaving process by the interleave unit 52. The output signal of the interleave signal is modulated by the information modulator 2. The output signal of the information modulator 2 is subjected to the spectrum spreading process by the spread spectrum modulator 5. The modulated signals generated by the pilot channel transmit unit 40 and the traffic channel transmit units $\mathbf{41}_1$ through $\mathbf{41}_n$ are combined by a combiner 53. The error correction encoder 51 and the interleave unit 52 are also employed in FIG. 1, but are not shown for the sake of simplicity.

A combined signal thus produced passes through a band limiter 54, a frequency converter 55, and a power amplifier 56, and is transmitted via an antenna 57.

Figure 8:
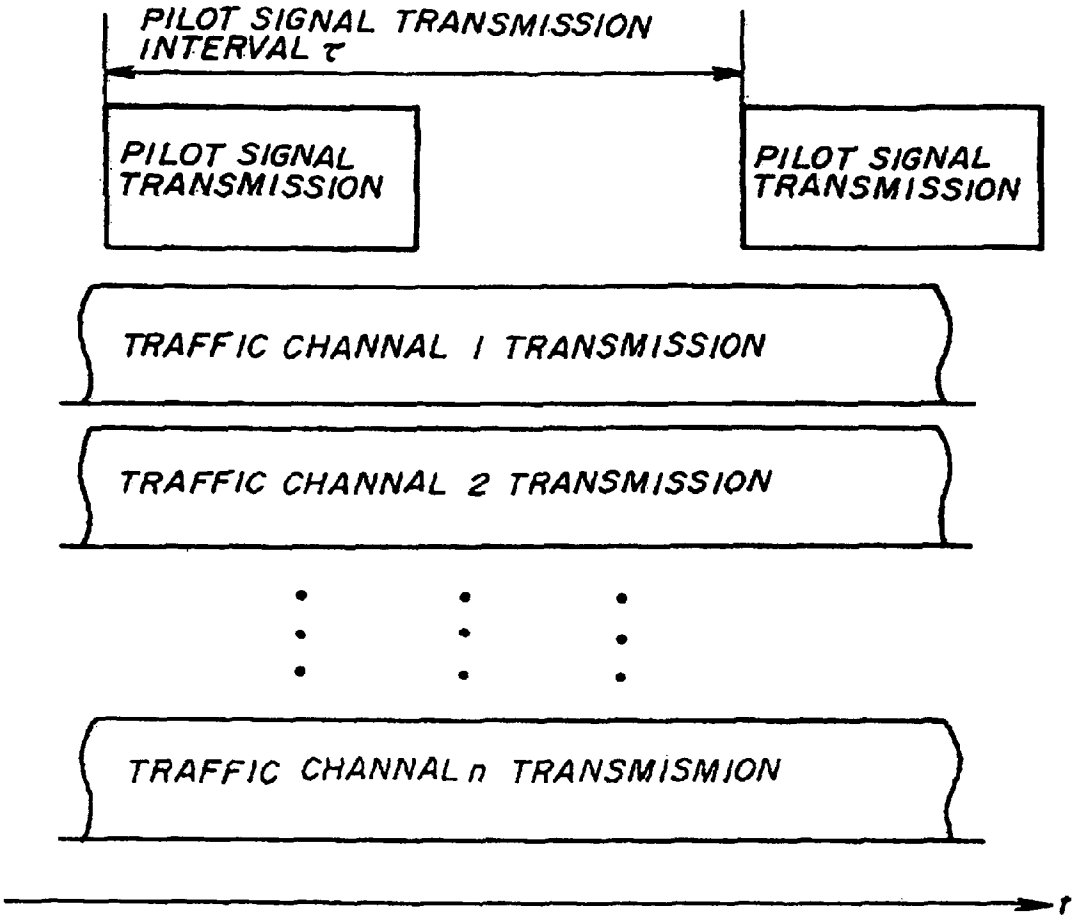
FIG. 8 is a diagram showing transmissions in a pilot channel and traffic channels in the system according to the first embodiment of the present invention.

FIG. 8 is a timing chart of an operation of the transmitter shown in FIG. 7. The pilot channel transmit unit 46 intermittently transmits the pilot signal at an interval τ. One cycle of the spreading code for the pilot channel is completed in the period during which the pilot signal is transmitted. The cycle of the spreading code for the pilot channel is shorter than the transmission interval τ of the pilot signal. The above intermittent transmission of the pilot signal is controlled by the pilot transmission timing signal generated by the generator 50. During the interval between two consecutive pilot signals, only the traffic channel signals are transmitted.

Figure 4:
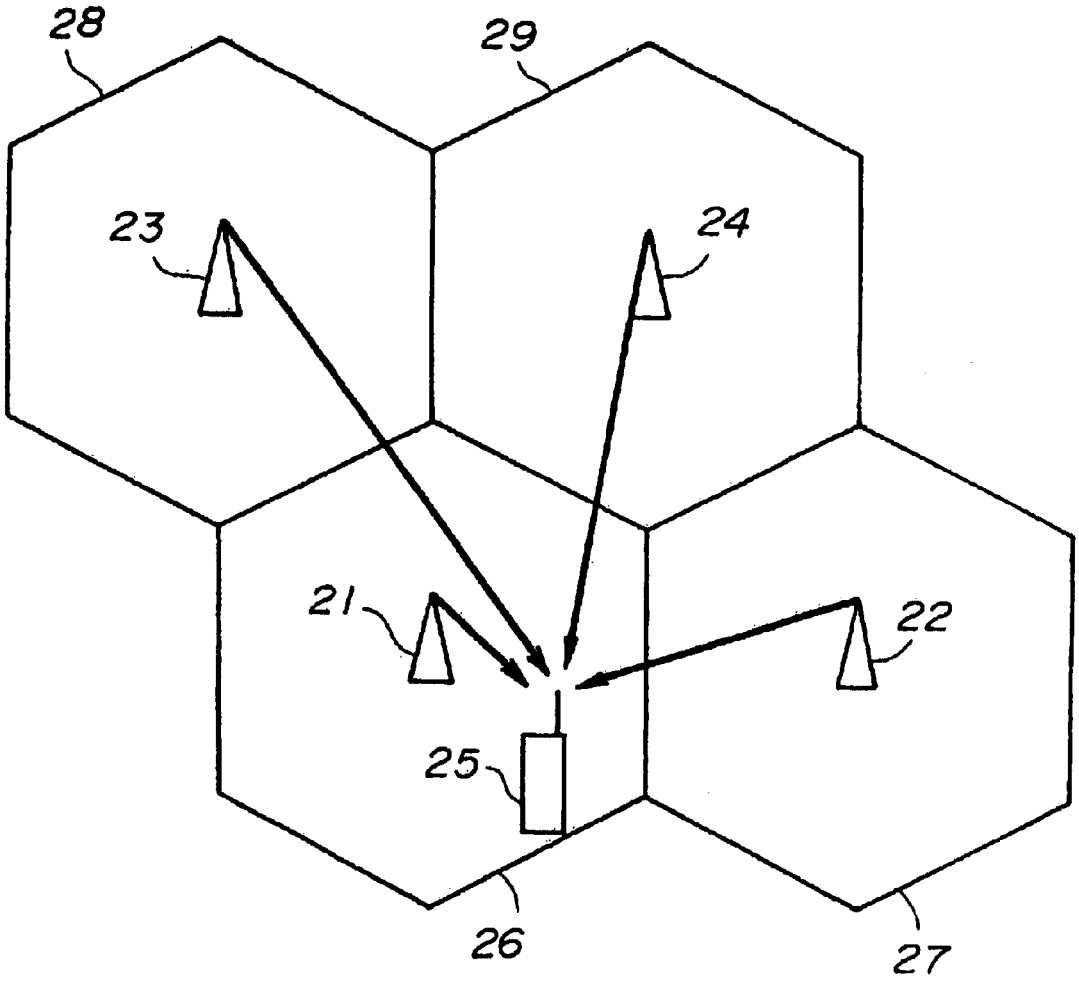
FIG. 4 PRIOR ART
FIG. 4 is a diagram of a cell arrangement.
Figure 5:
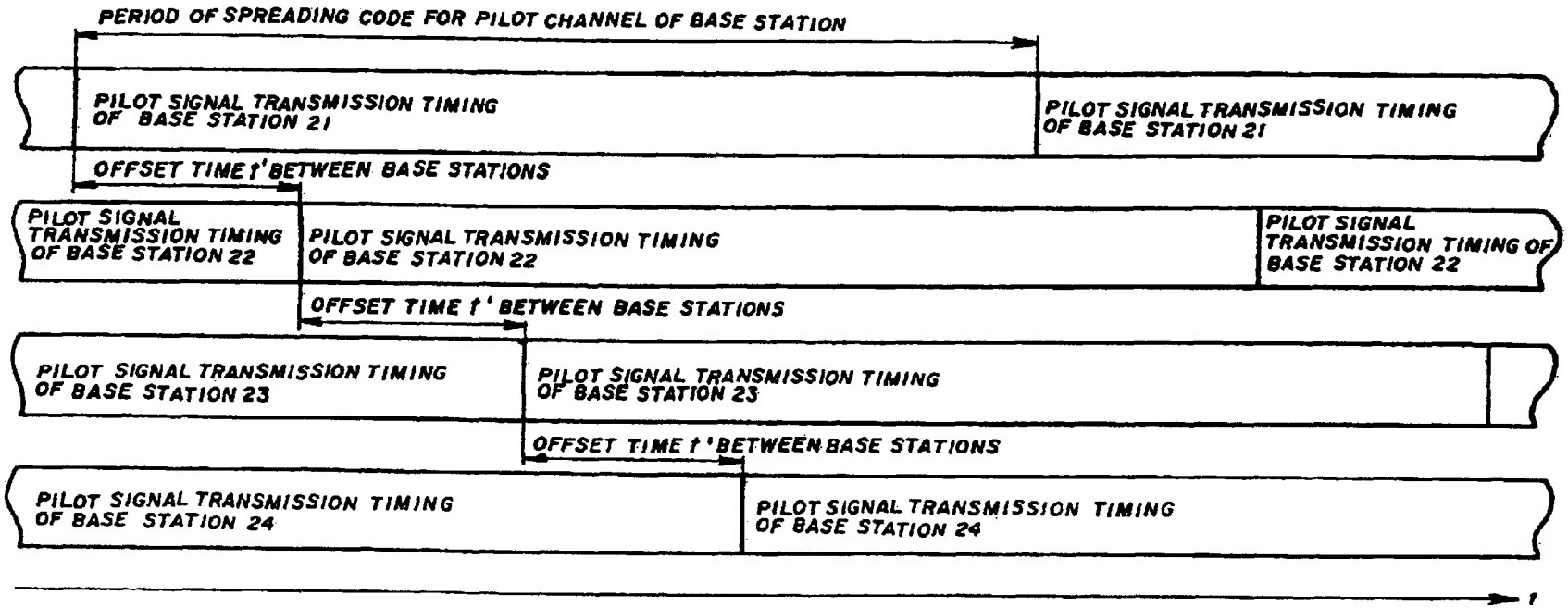
FIG. 5 PRIOR ART
FIG. 5 is a diagram showing transmissions of pilot signals in the cells in the conventional system.
Figures 6A, 6B, 6C, 6D:
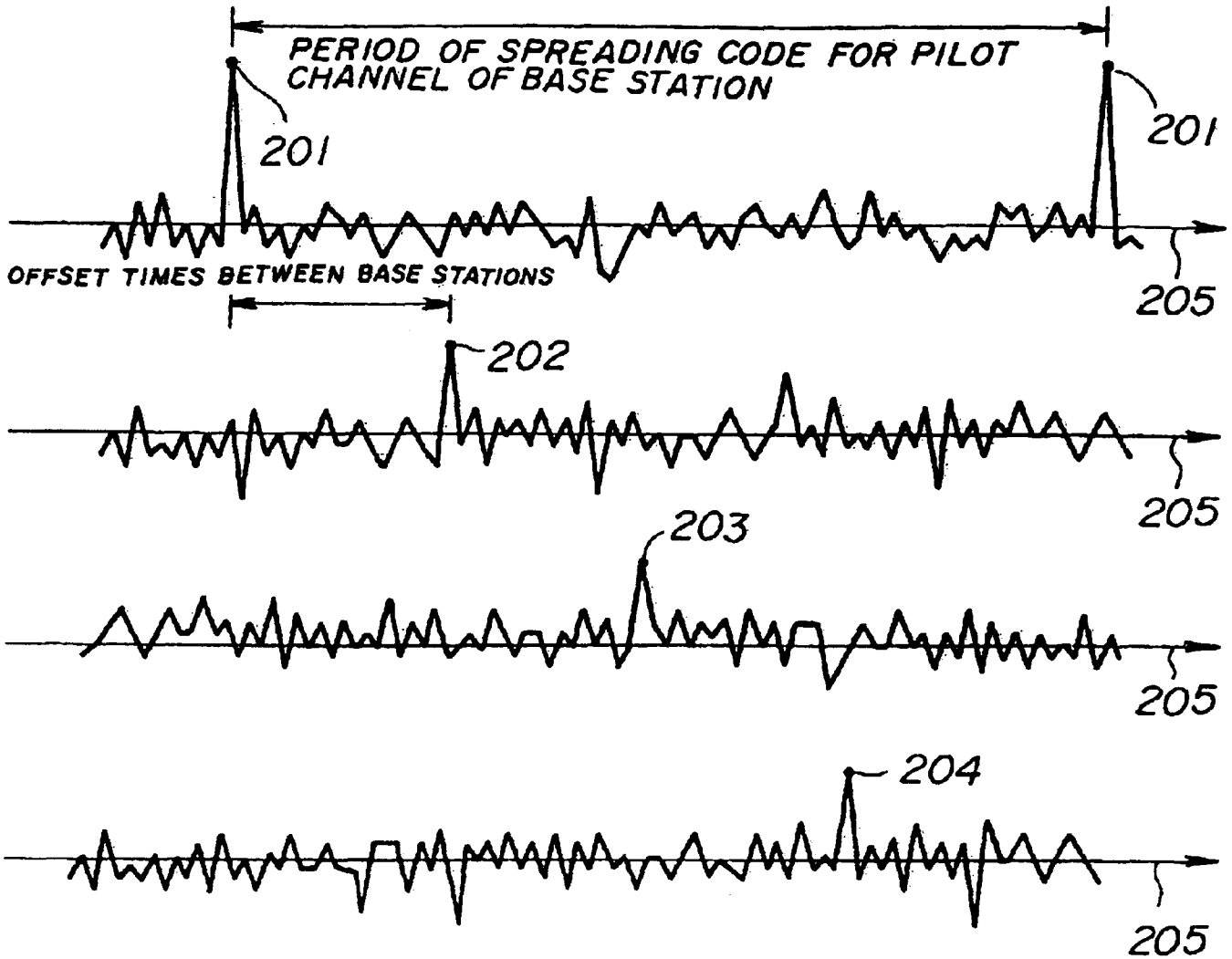
FIG. 6A PRIOR ART
FIG. 6B PRIOR ART
FIG. 6C PRIOR ART
FIG. 6D PRIOR ART
FIGS. 6A, 6B, 6C and 6D are waveform diagrams showing correlations obtained after a despreading process in the conventional system.
Figure 9:
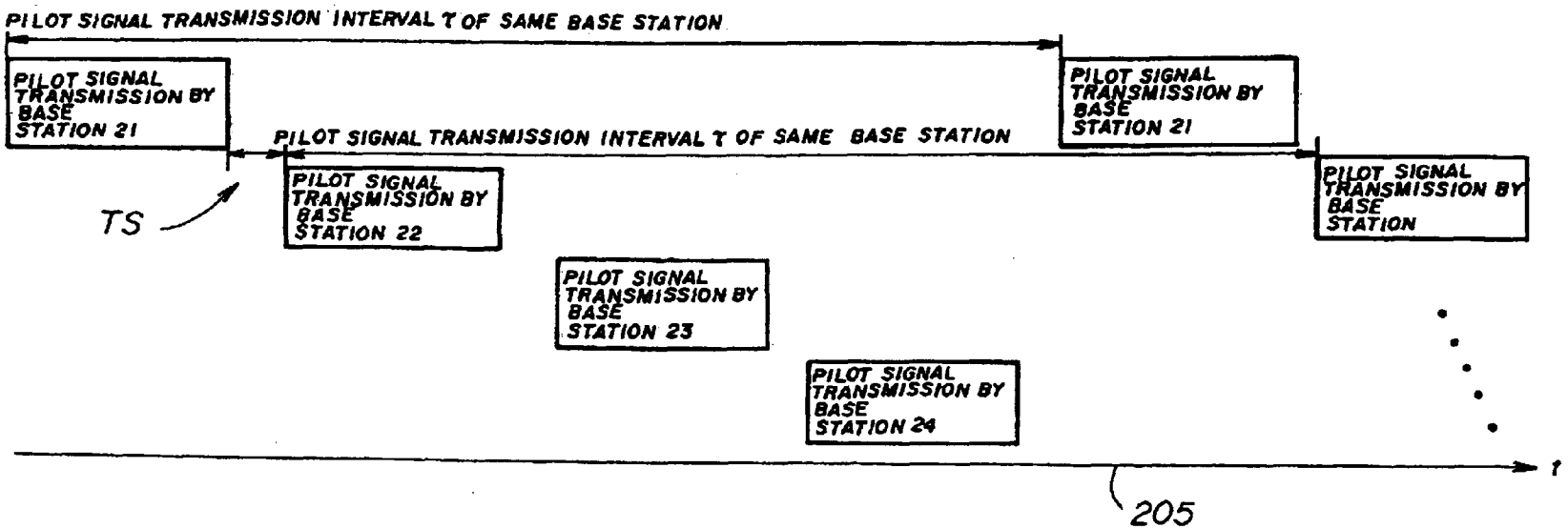
FIG. 9 is a diagram showing transmissions of pilot signals in cells in the system according to the first embodiment of the present invention.

When the base stations 21 through 24 shown in FIG. 4 have transmitters configured as shown in FIG. 7, the transmitters of the base stations 21 through 24 transmit respective pilot signals, as shown in FIG. 9. The base stations 21 through 24 intermittently transmit the pilot signals at the intervals τ, and start to transmit them at different timings corresponding to respective inherent time offsets so that a plurality of base stations *do not* simultaneously transmit the respective pilot signals.

In the case shown in FIG. 9, sections TS are provided in which none of the base stations transmit the respective pilot signals. When the sections TS are set longer than the delay time of the multipath, it is possible to prevent a delay wave of the pilot signal transmitted by a base station and propagated through the multipath from overlapping with the pilot signal next transmitted by another base station. If the distances between the base stations are short and there are short delay times, as in the case of a radio LAN system, it will be not necessary to provide the time sections TS.

Figure 10:
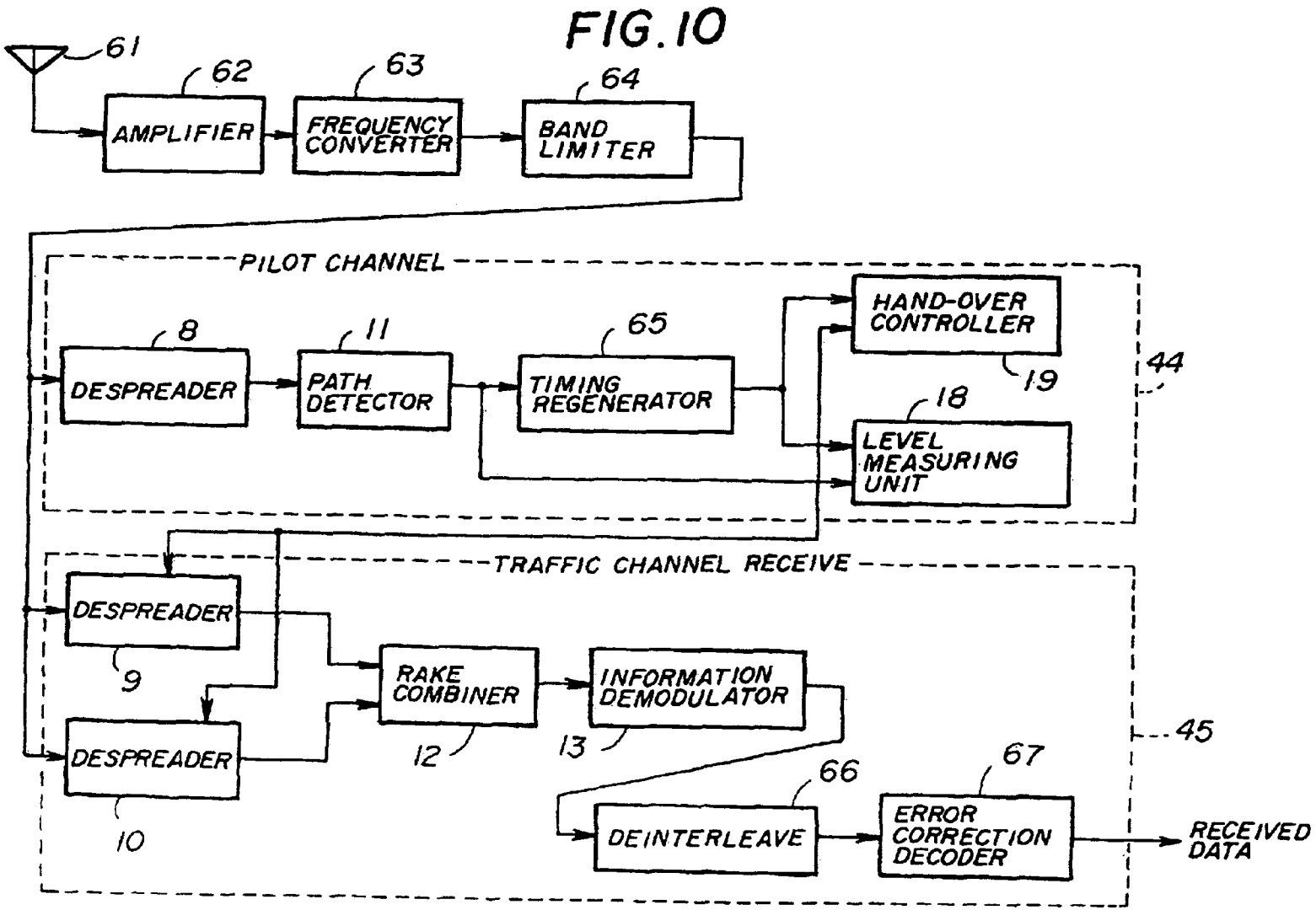
FIG. 10 is a block diagram of a spread spectrum communication receiver used in the system according to the first embodiment of the present invention.

FIG. 10 is a block diagram of a spread spectrum communication receiver used in the CDMA mobile communication system according the first embodiment of the present invention. In FIG. 10, parts that are the same as those shown in the previously described figures are given the same reference numbers. The receiver shown in FIG. 10 includes an antenna 61, an amplifier 62, a frequency converter 63, a band limiter 64, a pilot channel receive unit 44 and a traffic channel receive unit 45.

The pilot channel receive unit 44 includes a receive level measuring unit 18, a hand-over controller 19 and a timing regenerator 65. The despreader 8 performs the despreading process on the received signal by using the spreading code for the pilot channel. The path detector 11 detects the paths of the received signal having respective delay times. The timing regenerator 65 regenerates a timing signal indicative of the beginning of the pilot signal transmission interval τ by using the output signal of the path detector 11. The hand-over controller 19 performs the hand-over process by using the output signal of the path detector 11 and the timing signal regenerated by the timing regenerator 65. The receive level measuring unit 18 measures the receive power level of the detected path at the timing indicated by the timing signal.

A further description of the pilot channel receive unit 44 will be given with reference to FIGS. 11A through 11E.

Figures 11A, 11B, 11C, 11D, 11E:
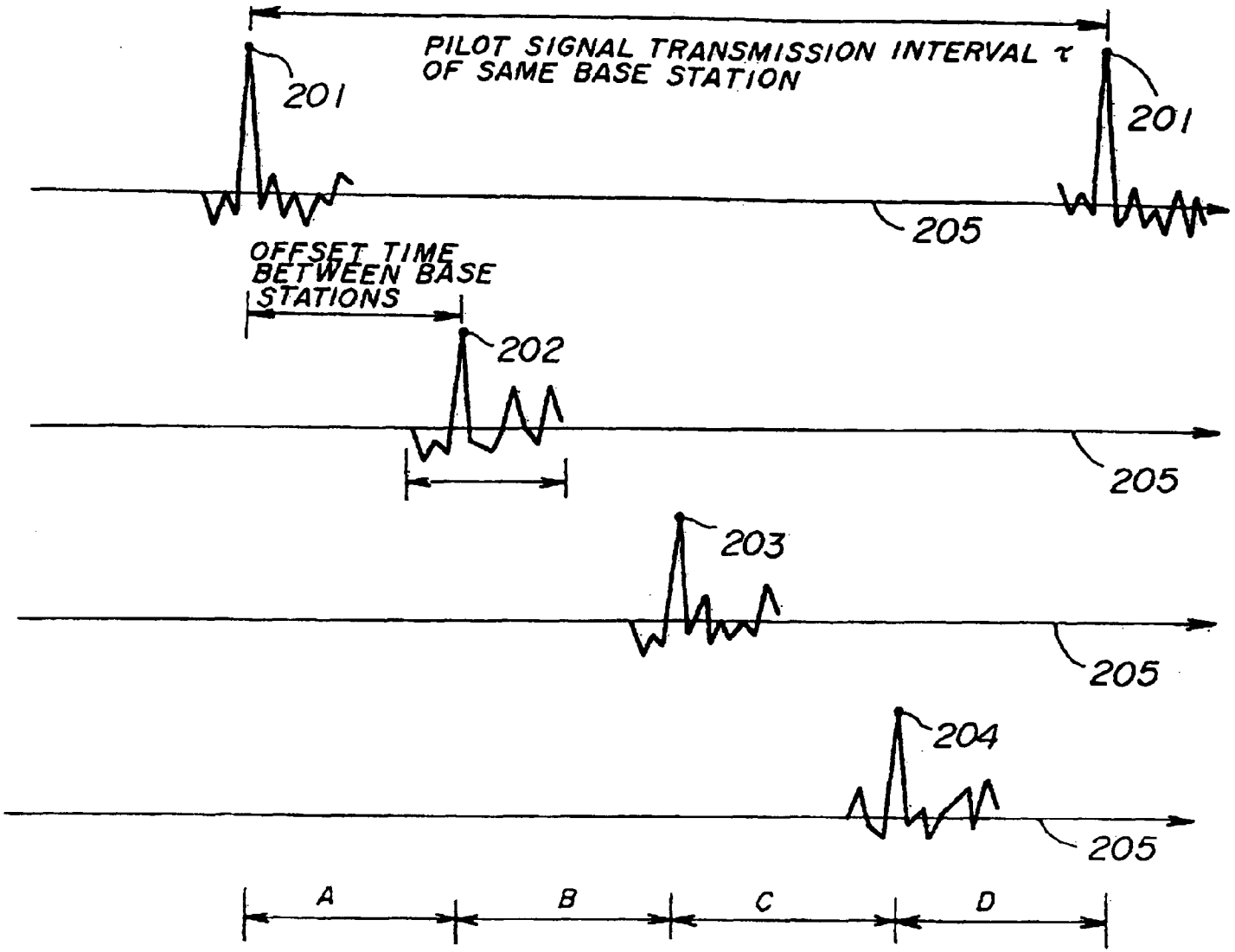
FIGS. 11A, 11B, 11C, 11D and 11E are waveform diagrams showing correlations obtained after a despreading process in the system according to the first embodiment of the present invention.

The path detector 11 detects peaks of the pilot signals in sections A, B, C and D shown in FIG. 11E, which corresponds to the offset times between the base stations 21, 22, 23 and 24 shown in FIG. 4. The path detector 11 detects peaks 201, 202, 203 and 204 in the sections A, B, C and D, respectively, and compares them with each other in order to select the greatest peak from among them. In the case shown in FIG. 4, the mobile station 25 is closet to the base station 21, and the peak 201 is greater than the peaks 202, 203 and 204. The traffic channel receive unit 45 shown in FIG. 10 operates based on the greatest peak 201. The timing regenerator 65 regenerates the timing signal from the timing of the greatest peak 201. The pilot signal transmission interval τ of each base station is known. Hence, it is possible to estimate the next pilot signal transmission time from the timing of the peak 201 transmitted by the base station 21. In this manner, the timing signal can be reproduced.

The hand-over controller 19 performs the hand-over control when the path detector 11 detects the greatest peak from another base station. In response to the timing signal based on the timing of the greatest peak of another base station, the hand-over control is carried out. The receive level measuring unit 18 measures the receive power level of the greatest peak and thus determines a transmit power level of the mobile station 25.

Turning to FIG. 10 again, the traffic channel receive unit 45 includes the despreaders 9, and 10, the RAKE combiner 12, the information demodulator 13, a deinterleave unit 66 and an error correction decoder 67. The deinterleave unit 66 performs a deinterleaving operation on the demodulated signal from the information demodulator 13. The error correction decoder 67 performs an error correction and decoding process on the output signal of the deinterleave unit 66.

Figure 12:
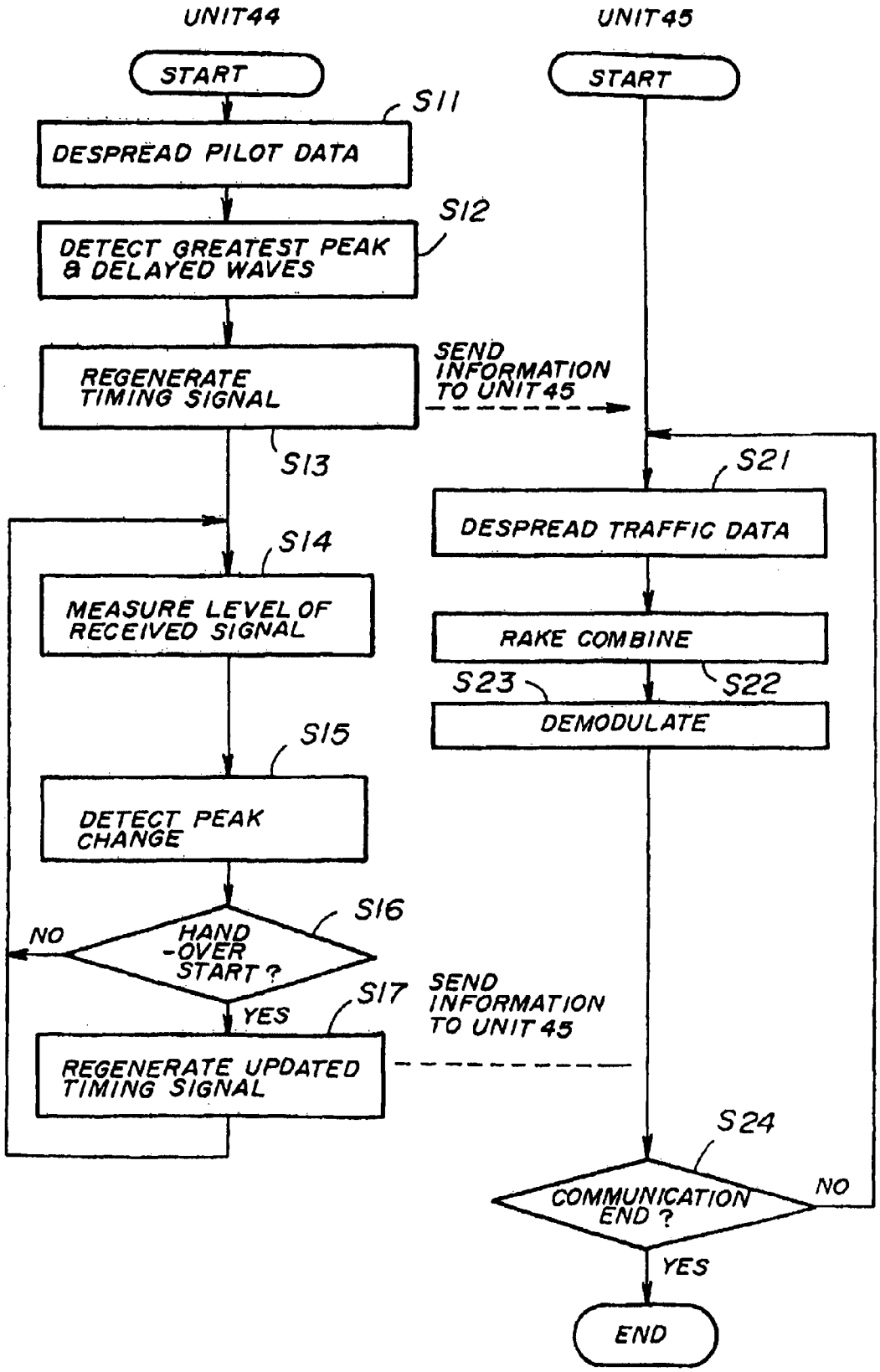
FIG. 12 is a flowchart of an operation of the spread spectrum communication receiver shown in FIG. 10.

FIG. 12 is a flowchart of an operation of the spread spectrum communication receiver shown in FIG. 10 according to the first embodiment of the present invention.

At step S11, the despreader 8 despreads the received signal by using the spreading code for the pilot channel. At step S12, the path detector 11 detects the greatest peak (the peak having the greatest amplitude) as has been described previously. At this time, peaks propagated through some delayed paths following the greatest peak are also detected for the RAKE combine process, and timing information concerning these peaks is applied to the traffic channel receive unit 45, as indicated by a broken arrow in FIG. 12. At step S13, the timing regenerator 65 regenerates the timing signal, as has been described previously. At step S14, the receive level measuring unit 18 measures the receive power levels of the peaks detected by the path detector 11.

At step S15, the path detector 11 detects that the greatest peak is transmitted by a base station other than the base station currently identified. Thus, the hand-over control is started at step S16, and the timing regenerator 65 starts to regenerate the timing signal based on the peak detected by step S15, at step S17. At this step, the timing information concerning the peak detected at step S15 is supplied to the traffic channel receive unit 45.

The despreaders 9 and 10 of the traffic channel receive unit 45 despread the received signal by the spreading codes with an offset time at step S21. For example, the despreader 9 despreads the received signal at the timing when the greatest peak is detected by the path detector 11, and the despreader 10 despreads the received signal with an offset time corresponding to a delay time of the second greatest peak detected by the path detector 11. At step S22, the RAKE combiner 12 combines the despread received signals by the RAKE combine process. At step S23, the information demodulator 13 demodulates the RAKE-combined signal. Then, the deinterleaving process and the error-correction coding process are successively carried out.

According to the first embodiment of the present invention, the following advantages can be obtained. The output signal of the despreader 8 has the signals shown in FIGS. 11A through 11D superimposed. At the pilot signal transmission timing of the base station 21 to which the mobile station 25 belongs, the other base stations 22, 23 and 24 do not transmit the pilot signals. Hence, at the pilot signal transmission timing of the base station, the pilot signals of the base stations 22, 23 and 24 to which the mobile station 25 does not belong are not superimposed and no noise is added to the pilot signal transmitted by the base station 21. Hence, a high S/N ratio can be obtained.

All the base stations 21 through 24 intermittently transmit the pilot signals at the different timings. Hence, the traffic channel receive unit 45 of the mobile station 25 receives interference signals for a short time, as compared to the prior art in which all the base stations continue to transmit the pilot signals. As a result, an increased number of stations in the same frequency band can be accommodated. In other words, the channel capacity can be increased.

The spreading code which has one period in the pilot signal transmission interval $\tau$ is used in the spread spectrum modulator 3 shown in FIG. 7. Alternatively, it is possible to use a spreading code that has a plurality of periods in the pilot signal transmission interval $\tau$. Even in this case, the same effects as those obtained when the spreading code having one period in the interval $\tau$ can be obtained. It is also possible to use a spreading code having a period longer than the pilot signal transmission interval $\tau$. In this case, a part of the spreading code is transmitted in the pilot signal transmission interval $\tau$. Even in this case, the same effects as those obtained when the spreading code having one period in the interval $\tau$ can be obtained.

In the above description of the first embodiment of the present invention, the base stations transmit the pilot signals, and the mobile stations receive them. However, the concept of the first embodiment of the present invention can be applied to a structure in which the mobile stations transmit signals such as pilot signals and the base stations receive these signals.

The above description of the first embodiment of the present invention is directed to use of four cells. However, the same effects as those obtained in the case of four cells can be obtained even when a different number of cells are used.

When a small number of cells are provided, it is possible to realize an arrangement in which, when one base station transmits the pilot signal, the other base stations do not transmit the pilot signals. If a large number of cells are provided, it may be difficult to realize the above arrangement. In this case, a plurality of base stations are allowed to simultaneously transmit the pilot signals under a condition that these base stations are sufficiently away from each other and the mobile station located therebetween receives sufficiently attenuated pilot signals therefrom due to propagation-based attenuation.

In the aforementioned description, the time sections TS are provided as shown in FIG. 9, during which none of the base stations transmit the pilot signals. However, the time sections TS are completely or partially omitted.

In the aforementioned description, the pilot transmission timing signal is applied to the units 1, 2 and 3, as shown in FIG. 7. However, it is possible to modify the structure shown in FIG. 7 so that the pilot transmission timing signal is applied to only one or two of the units 1, 2 and 3 to thereby intermittently transmit the pilot signal.

A description will now be given of a second embodiment of the present invention.

Figure 13:
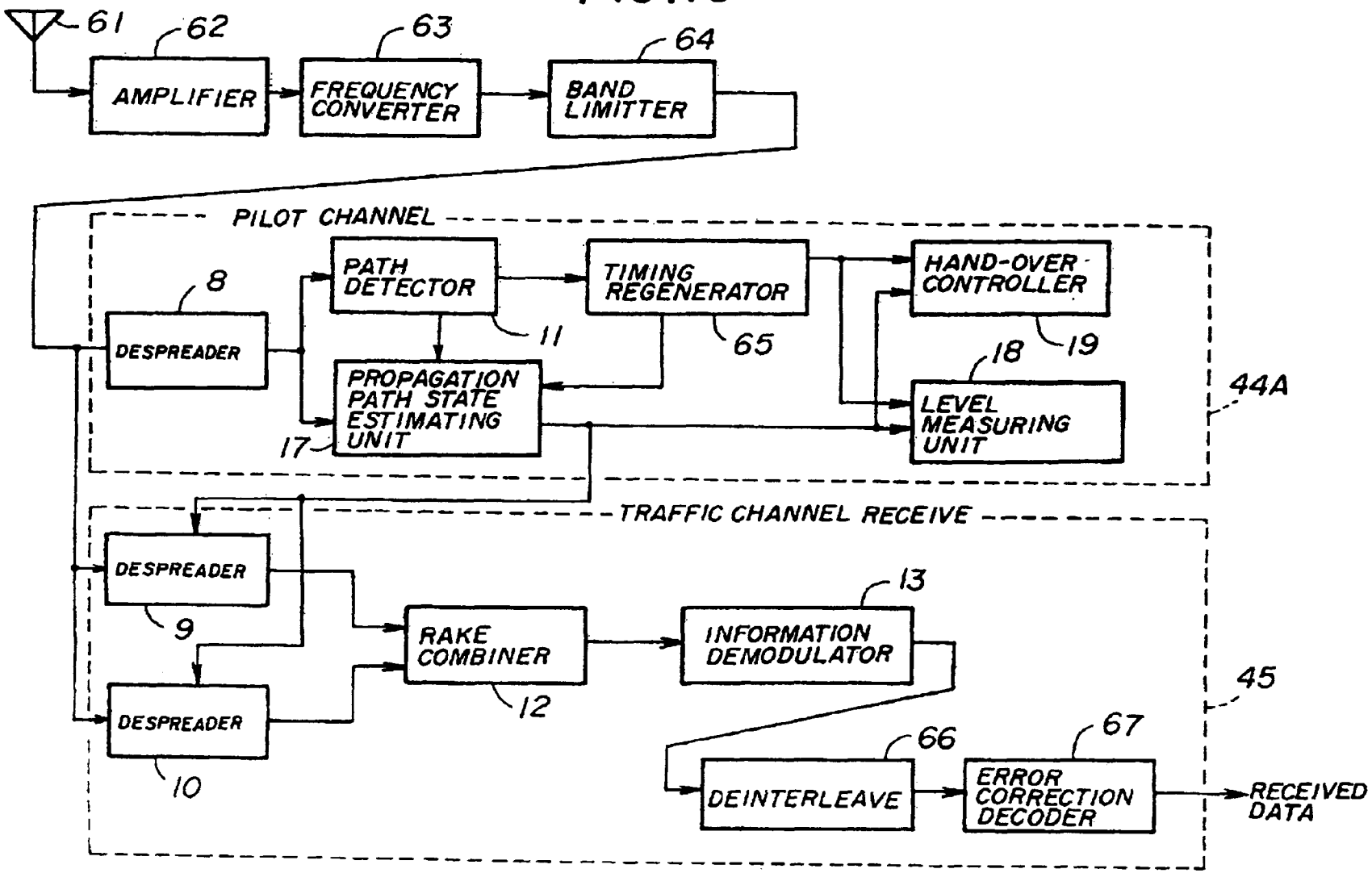
FIG. 13 is a block diagram of a spread spectrum communication transmitter according to a second embodiment of the present invention.

FIG. 13 is a block diagram of a spread spectrum communication receiver according to the second embodiment of the present invention. In FIG. 13, parts that are the same as those shown in the previously described figures are given the same reference numbers. The receiver shown in FIG. 13 has a pilot channel receive unit 44A in which a propagation path state estimating unit 17 is provided. The propagation path state estimating unit 17 estimates the state of the propagation path by using the pilot signals intermittently transmitted.

Figure 14:
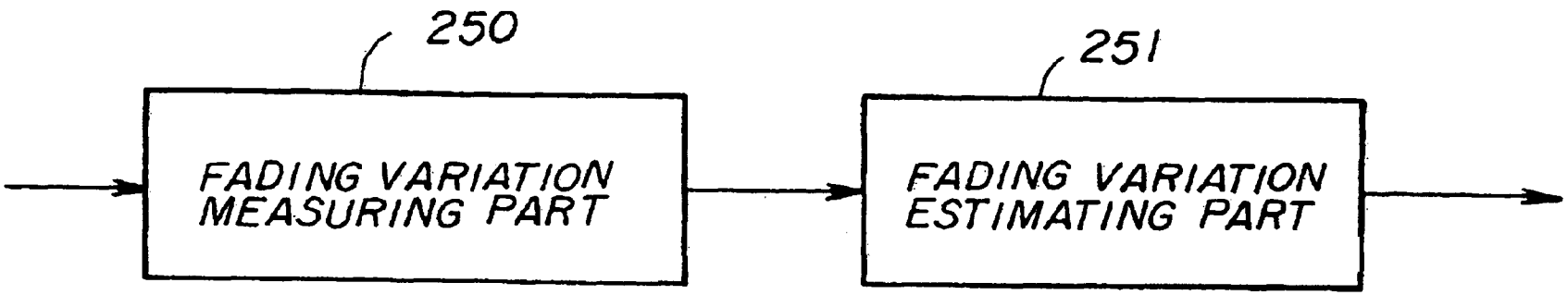
FIG. 14 is a block diagram of a propagation path state estimating unit shown in FIG. 13.

FIG. 14 shows a structure of the propagation path state estimating unit 17. As shown in FIG. 14, the unit 17 includes a fading variation measuring part 250 and a fading variation estimating part 251 receiving an output signal of the fading variation measuring part 250.

In the actual mobile communication systems, a radio wave propagated through a transmission path is affected by multipath fading and Rayleigh fading.

Figure 15A:
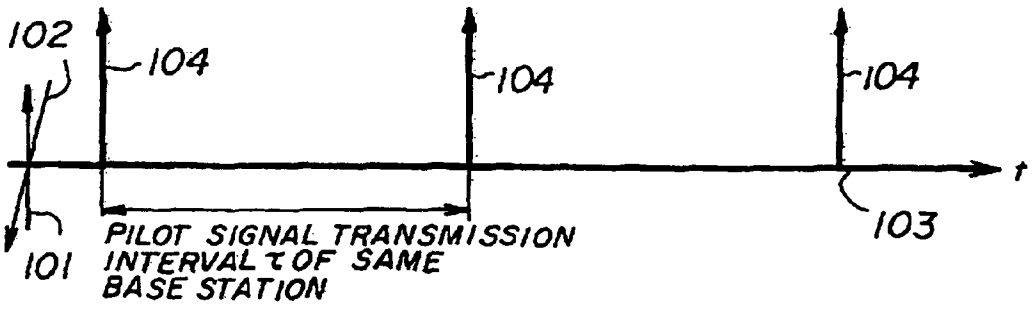
FIGS. 15A, 15B and 15C are diagrams of despread output signals.
Figure 15B:
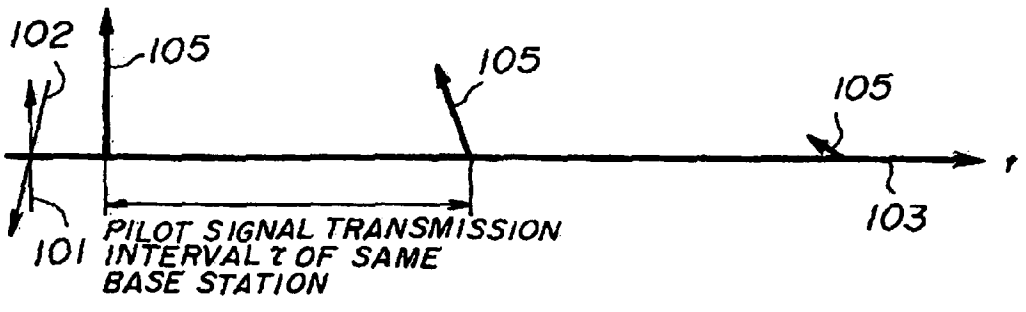
Figure 15C:
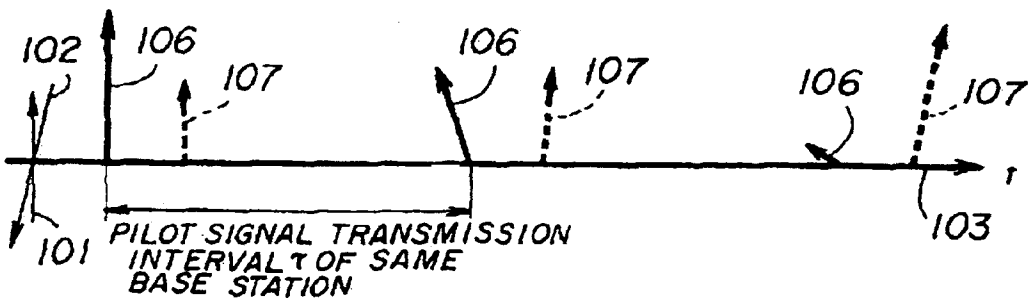

FIGS. 15A through 15C show examples of the despread output signals. In these figures, the signals transmitted by the base station 21 to which the mobile station 25 belongs are shown. Further, vectors are used to indicate the peak points (locations) and magnitudes of the correlation waveform necessary for the demodulating process. A reference number 101 indicates an orthogonal axis and a reference number 102 indicates an in-phase axis. Further, a reference number 103 denotes a time axis.

FIG. 15A shows the despread output signal which has not been affected by fading variation. A vector 104 indicates the amplitude and phase of each peak 201 shown in FIG. 11A. FIG. 15B shows the despread output signal which has been affected by Rayleigh fading so that the amplitude and phase of a vector 105 are varied with time. The amplitude and phase of the vector 105 are varied due to the state of the propagation path. FIG. 15C shows the despread output signal which has been affected by two-wave multipath fading. A reference number 106 indicates a leading wave, and a reference number 107 indicates a delayed wave. The amplitudes and phases of both of the waves 106 and 107 are varied.

The pilot signal transmitted by the base station 21 is known data. Hence, the despread output waveform of the pilot signal transmitted by the base station 21 without being affected by any fading (FIG. 15A) is also known for the mobile station 25. Hence, it is possible to estimate, in the mobile station 25, variations (FIGS. 15B and 15C) in the amplitude and phase of the pilot signal affected by fading during propagation as well as the difference between the leading wave and the delayed wave by comparing the despread output waveform without being affected by fading and the despread output waveform affected by fading.

As has been described previously, the pilot signal is intermittently transmitted by each of the base stations with time offsets. Hence, the magnitudes of variations in the amplitude and phase of the pilot signal caused by fading and measured by the fading variation measuring part 250 shown in FIG. 14 correspond to data obtained by sampling the pilot signal at intervals τ. Hence, the fading variation estimating part 251 interpolate the sampled data output by the fading variation measuring part 250, and thus estimates fading variations in each pilot signal transmission interval with respect to the same base station.

Figure 16:
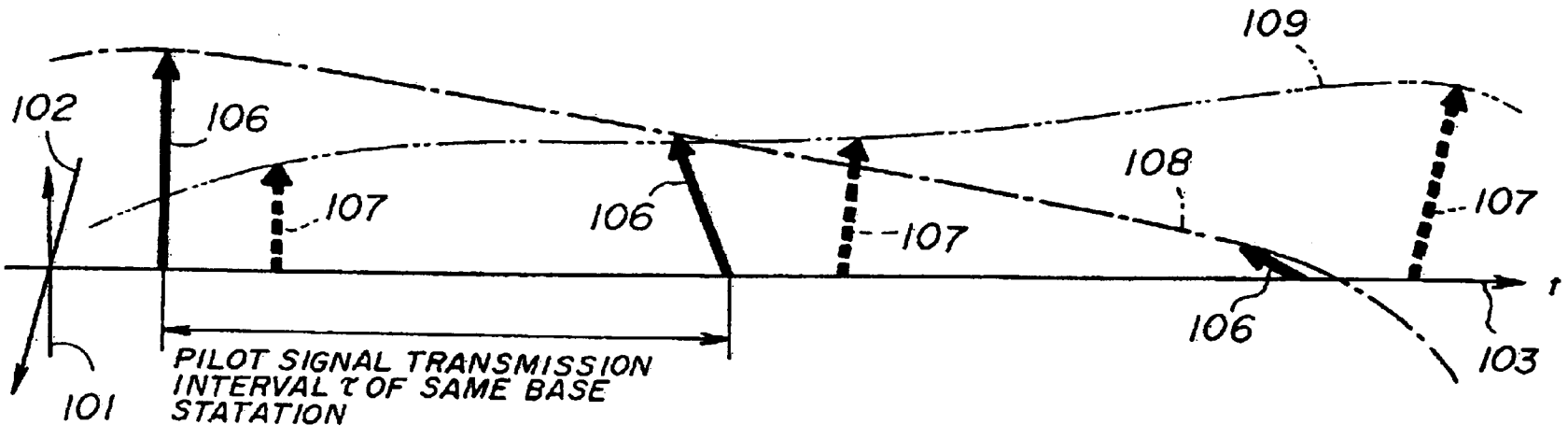
FIG. 16 is a diagram showing an operation of the propagation path state estimating unit shown in FIG. 14.

FIG. 16 shows estimated results output by the fading estimating part 251. The fading variation estimating part 251 outputs an estimated fading variation 108 of the leading wave and an estimated fading variation 109 of the delayed wave. These estimated variations 108 and 109 are used to determine the timings at which the despreaders 9 and 10 start to despread the received signal and weight coefficients for the RAKE combine process carried out by the RAKE combiner 12.

In the aforementioned first embodiment of the present invention, the RAKE combine is carried out by using the information concerning the phase, amplitude and timing of the pilot signal that is intermittently transmitted. Hence, the RAKE combine carried out during the time when the pilot signal is not received employs the information obtained when the pilot signal is actually received. On the other hand, according to the second embodiment, variations in the despread output signal during the time when the pilot signal is not received are estimated as described above. Thus, the RAKE combine in the second embodiment of the present invention uses the estimated results 108 and 109 and the received signal of the traffic channel. Hence, the performance of the receiver according to the second embodiment of the present invention can be further improved.

The receive level measuring unit 18 shown in FIG. 13 can determine the receive power level taking into account an influence of fading. Hence, the transmission power can be determined more precisely. The hand-over controller 19 also utilizes the variations due to fading, and can perform the take-over process more precisely.

The present invention is not limited to the specifically disclosed embodiments, and variations and modifications may be made without departing from the scope of the present invention.

What is claimed is:

1. A transmitter used in a CDMA mobile communication system comprising:

a pilot transmit unit further comprising:

a pilot data generator which generates pilot data;

a first modulator which modulates the pilot data;

a second modulator which spreads a spectrum of modulated pilot data from the first modulator to thereby generate a pilot signal; and a timing generator which generates a timing signal applied to at least one of the pilot data generators and the first and second modulators so that the pilot signal is intermittently transmitted; and traffic channel transmit units which respectively transmit data signals in respect of traffic channels.

2. A transmitter used in a CDMA mobile communication system as claimed in claim 1, wherein said pilot signal has a period shorter than an interval in which the pilot signal is intermittently transmitted.

3. A receiver used in a CDMA mobile communication system comprising:

a pilot channel receive unit which demodulates pilot signals respectively transmitted intermittently in a spread spectrum formation by transmitters, and detects from the pilot signals, a timing for a traffic channel demodulation; and a traffic channel receive unit which demodulates data at the timing detected by said pilot channel receive unit; and the timing detected by comparing peaks of the pilot signals intermittently transmitted, the timing for the traffic channel demodulation corresponding to a greatest one of the peaks.

*4. A transmitter used in a CDMA mobile communication system, comprising:*

*a pilot channel transmit unit which is configured to transmit a pilot signal in a spread spectrum formation; and*

*traffic channel transmit units which are configured respectively to transmit data signals in respective traffic channels,*

*wherein the pilot channel transmit unit is configured to transmit the pilot signal intermittently; a start timing of the pilot signal is offset from a start timing of a pilot signal transmitted by another transmitter in said CDMA mobile communication system; and said pilot signal whose start timing is offset has a period shorter than an interval at which said pilot signal whose start timing is offset is transmitted, and*

*wherein the data signals are transmitted continuously even when the pilot signal is transmitted intermittently.*

*5. A transmitter used in a CDMA mobile communication system, comprising:*

*a pilot channel transmit unit which is configured to transmit a first pilot signal intermittently in a spread spectrum formation; and*

*traffic channel transmit units that are configured respectively to transmit data signals in respective traffic channels,*

*wherein the pilot channel transmit unit is configured to start to transmit the first pilot signal at a different timing from a timing at which another pilot channel transmitter in said CDMA mobile communication system starts to transmit a second pilot signal, and said first pilot signal has a period shorter than an interval at which said first pilot signal is transmitted, and*

*wherein the data signals are transmitted continuously even when the pilot signal is transmitted intermittently.*

*6. A receiver for use in a CDMA mobile communication system, comprising:*

*a pilot channel receive unit that receives pilot signals transmitted by transmitters in said CDMA mobile communication system,*

*wherein a start timing of the pilot signals transmitted by different transmitters are offset from each other, and each pilot signal has a period shorter than an interval at which each pilot signal is transmitted,*

*wherein data signals are transmitted continuously even when the pilot signal is transmitted intermittently.*

*7. A receiver for use in a CDMA mobile communication system, comprising:*

*a pilot channel receive unit which receives pilot signals transmitted by transmitters in said CDMA mobile communication system,*

*wherein the pilot signals start to be transmitted at different timing from each other, and each pilot signal has a period shorter than an interval at which each pilot signal is transmitted,*

*wherein data signals are transmitted continuously even when the pilot signal is transmitted intermittently.*

*8. A CDMA mobile communication method in a CDMA mobile communication system, comprising:*

*a transmitter, comprising:*

*a pilot channel transmit unit which is configured to transmit a pilot signal in a spread spectrum formation; and*

*traffic channel transmit units which are configured respectively to transmit data signals in respective traffic channels,*

*wherein the pilot channel transmit unit is configured to transmit the pilot signal intermittently; a start timing of the pilot signal is offset from a start timing of a pilot signal transmitted by another transmitter in said CDMA mobile communication system; and said pilot signal whose start timing is offset has a period shorter than an interval at which said pilot signal whose start timing is offset is transmitted,*

*wherein the data signals are transmitted continuously even when the pilot signal is transmitted intermittently; and*

*a receiver, comprising:*

*a pilot channel receive unit that receives pilot signals transmitted by transmitters in said CDMA mobile communication system,*

*wherein a start timing of the pilot signals transmitted by different transmitters are offset from each other, and each pilot signal has a period shorter than an interval at which each pilot signal is transmitted.*

*9. A CDMA mobile communication method in a CDMA mobile communication system, comprising the steps of:*

*a) transmitting, on transmit sides, pilot signals in a spread spectrum formation intermittently; and*

*b) receiving, on a receive side, pilot signals transmitted by transmitters in said CDMA mobile communication system,*

*wherein a start timing of a pilot signal is offset from a start timing of another pilot signal transmitted by another transmitter in said CDMA mobile communication system, and said pilot signal whose start timing is offset has a period shorter than an interval at which said pilot signal whose start timing is offset is transmitted, and*

*wherein data signals are transmitted continuously even when the pilot signal is transmitted intermittently.*

*10. A CDMA mobile communication method in a CDMA mobile communication system, comprising the steps of:*

*a) transmitting, on transmit sides, pilot signals in a spread spectrum formation intermittently; and*

*b) receiving, on a receive side, pilot signals transmitted by transmitters in said CDMA mobile communication system,*

*wherein the pilot signals start to be transmitted at different timing from each other, and each pilot signal has a period shorter than an interval at which each pilot signal is transmitted, and*

*wherein data signals are transmitted continuously even when the pilot signal is transmitted intermittently.*

*11. A CDMA mobile communication method in a CDMA mobile communication system, comprising:*

*a transmitter, comprising:*

*a pilot channel transmit unit which is configured to transmit a pilot signal in a spread spectrum formation; and*

*traffic channel transmit units which are configured respectively to transmit data signals in respective traffic channels,*

*wherein the pilot channel transmit unit is configured to transmit the pilot signal intermittently; a start timing of the pilot signal is offset from a start timing of a pilot signal transmitted by another transmitter in said CDMA mobile communication system; and said pilot signal whose start timing is offset has a period shorter than an interval at which said pilot signal whose start timing is offset is transmitted,*

*wherein the data signals are transmitted continuously even when the pilot signal is transmitted intermittently; and*

*a receiver, comprising:*

*a pilot channel receive unit which receives pilot signals transmitted by transmitters in said CDMA mobile communication system,*

*wherein the pilot signals start to be transmitted at different timing from each other, and each pilot signal has a period shorter than an interval at which each pilot signal is transmitted.*

*12. A CDMA mobile communication method in a CDMA mobile communication system, comprising:*

*a transmitter, comprising:*

*a pilot channel transmit unit which is configured to transmit a first pilot signal intermittently in a spread spectrum formation; and*

*traffic channel transmit units that are configured respectively to transmit data signals in respective traffic channels,*

*wherein the pilot channel transmit unit is configured to start to transmit the first pilot signal at a different timing from a timing at which another pilot channel transmitter in said CDMA mobile communication system starts to transmit a second pilot signal, and said first pilot signal has a period shorter than an interval at which said first pilot signal is transmitted,*

*wherein the data signals are transmitted continuously even when the pilot signal is transmitted intermittently; and*

*a receiver, comprising:*

*a pilot channel receive unit that receives pilot signals transmitted by transmitters in said CDMA mobile communication system,*

*wherein a start timing of the pilot signals transmitted by different transmitters are offset from each other, and each pilot signal has a period shorter than an interval at which each pilot signal is transmitted.*

*13. A CDMA mobile communication method in a CDMA mobile communication system, comprising:*

*a transmitter, comprising:*

*a pilot channel transmit unit which is configured to transmit a first pilot signal intermittently in a spread spectrum formation; and*

*traffic channel transmit units that are configured respectively to transmit data signals in respective traffic channels,*

*wherein the pilot channel transmit unit is configured to start to transmit the first pilot signal at a different timing from a timing at which another pilot channel transmitter in said CDMA mobile communication system starts to transmit a second pilot signal, and said first pilot signal has a period shorter than an interval at which said first pilot signal is transmitted,*

*wherein the data signals are transmitted continuously even when the pilot signal is transmitted intermittently;*

*a receiver, comprising:*

*a pilot channel receive unit which receives pilot signals transmitted by transmitters in said CDMA mobile communication system,*

*wherein the pilot signals start to be transmitted at different timing from each other, and each pilot signal has a period shorter than an interval at which each pilot signal is transmitted.*

* * * * *